(12) United States Patent
Kubo et al.

(10) Patent No.: US 10,298,794 B2
(45) Date of Patent: May 21, 2019

(54) IMAGE READING DEVICE AND NON-TRANSITORY READABLE RECORDING MEDIUM

(71) Applicant: KONICA MINOLTA, INC., Chiyoda-ku, Tokyo (JP)

(72) Inventors: Hiroaki Kubo, Muko (JP); Katsuhiko Akita, Amagasaki (JP); Kaitaku Ozawa, Nishinomiya (JP); Kazusei Takahashi, Nishinomiya (JP); Akihiro Torigoshi, Itami (JP); Yuji Okamoto, Nishinomiya (JP)

(73) Assignee: KONICA MINOLTA, INC., Tokyo (JP)

( * ) Notice: Subject to any disclaimer, the term of this patent is extended or adjusted under 35 U.S.C. 154(b) by 19 days.

(21) Appl. No.: 15/055,734

(22) Filed: Feb. 29, 2016

(65) Prior Publication Data
US 2016/0277612 A1    Sep. 22, 2016

(30) Foreign Application Priority Data
Mar. 16, 2015    (JP) .................................. 2015-051686

(51) Int. Cl.
  *G06F 15/00*    (2006.01)
  *H04N 1/00*    (2006.01)
  *H04N 1/387*    (2006.01)
  *H04N 1/12*    (2006.01)
  *H04N 1/053*    (2006.01)

(52) U.S. Cl.
  CPC ..... *H04N 1/00726* (2013.01); *H04N 1/00843* (2013.01); *H04N 1/053* (2013.01); *H04N 1/121* (2013.01); *H04N 1/387* (2013.01); *H04N 1/3873* (2013.01)

(58) Field of Classification Search
  CPC ........... H04N 1/00726; H04N 1/00843; H04N 1/053; H04N 1/121; H04N 1/387; H04N 1/3873
  USPC ......................................................... 358/409
  See application file for complete search history.

(56) References Cited

U.S. PATENT DOCUMENTS 5,481,653 A * 1/1996 Kashiwagi ................ G06T 5/50
                                                            345/418
2006/0256362 A1* 11/2006 Guan ..................... G06T 1/0021
                                                            358/1.14

FOREIGN PATENT DOCUMENTS

JP    2005026880 A    1/2005

OTHER PUBLICATIONS

Machine translation of Japanese Patent Document No. 2005-026880, Fuse, Jan. 27, 2005.*

(Continued)

*Primary Examiner* — Mark R Milia
(74) *Attorney, Agent, or Firm* — Holtz, Holtz & Volek PC

(57) ABSTRACT

An image reading device comprises: a feeder that feeds a document along with a predetermined path; a first reading part that reads a first side of the document at a first position in the path and creates a first image; a second reading part that reads a second side of the document at a second position which is located posterior to the first position in the path and creates a second image; a synthesizing part that lays the first image and the second image on top of one another and creates a composite image; and a detecting part that detects a characteristic pattern of a specific document from the composite image created by the synthesizing part.

16 Claims, 16 Drawing Sheets

(56) References Cited

OTHER PUBLICATIONS

Chinese Office Action dated Mar. 13, 2018 issued in counterpart Chinese Application No. 201610146471.2.
Chinese Office Action (and English language translation thereof) dated Sep. 7, 2018 issued in counterpart Chinese Application No. 201610146471.2.

* cited by examiner

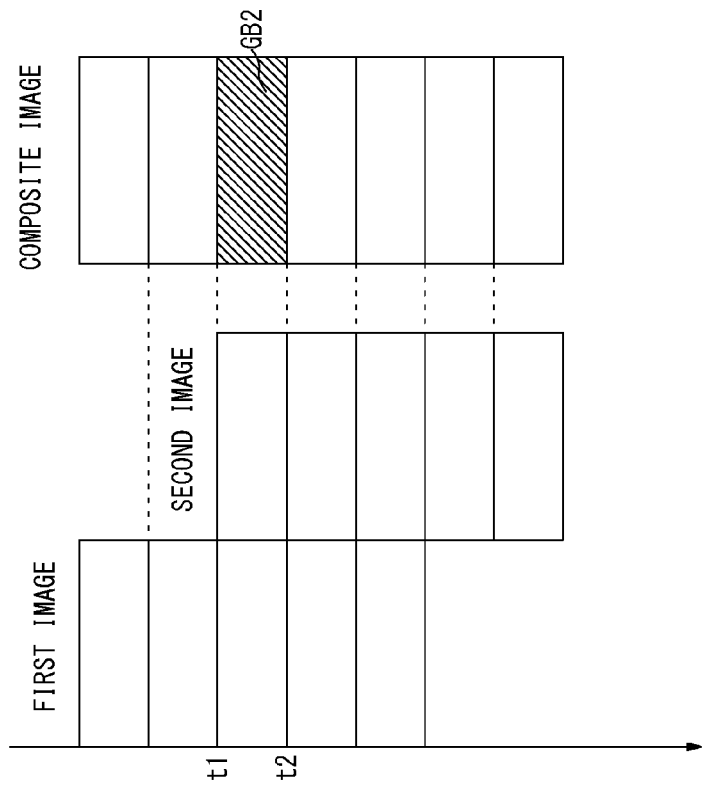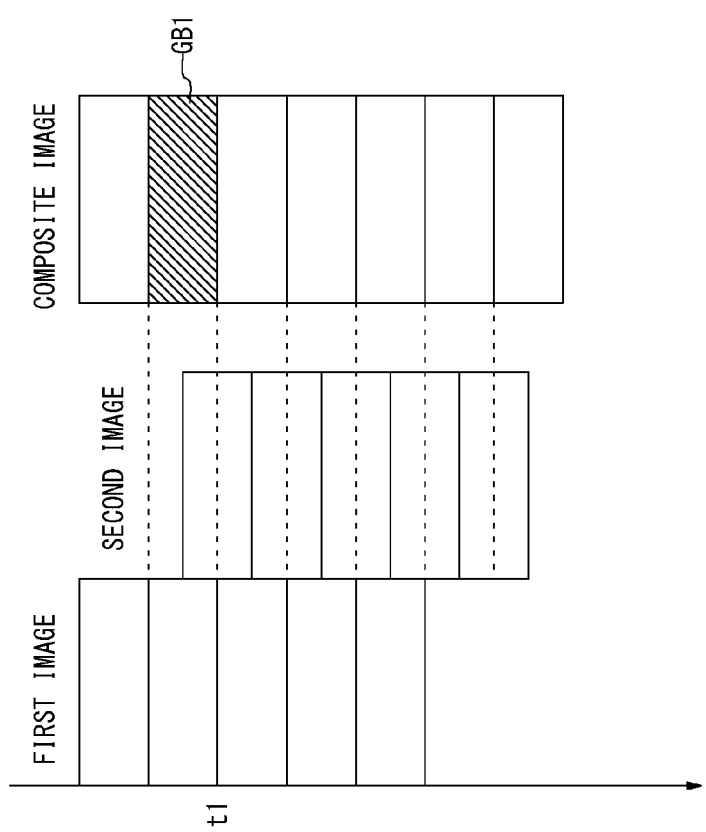

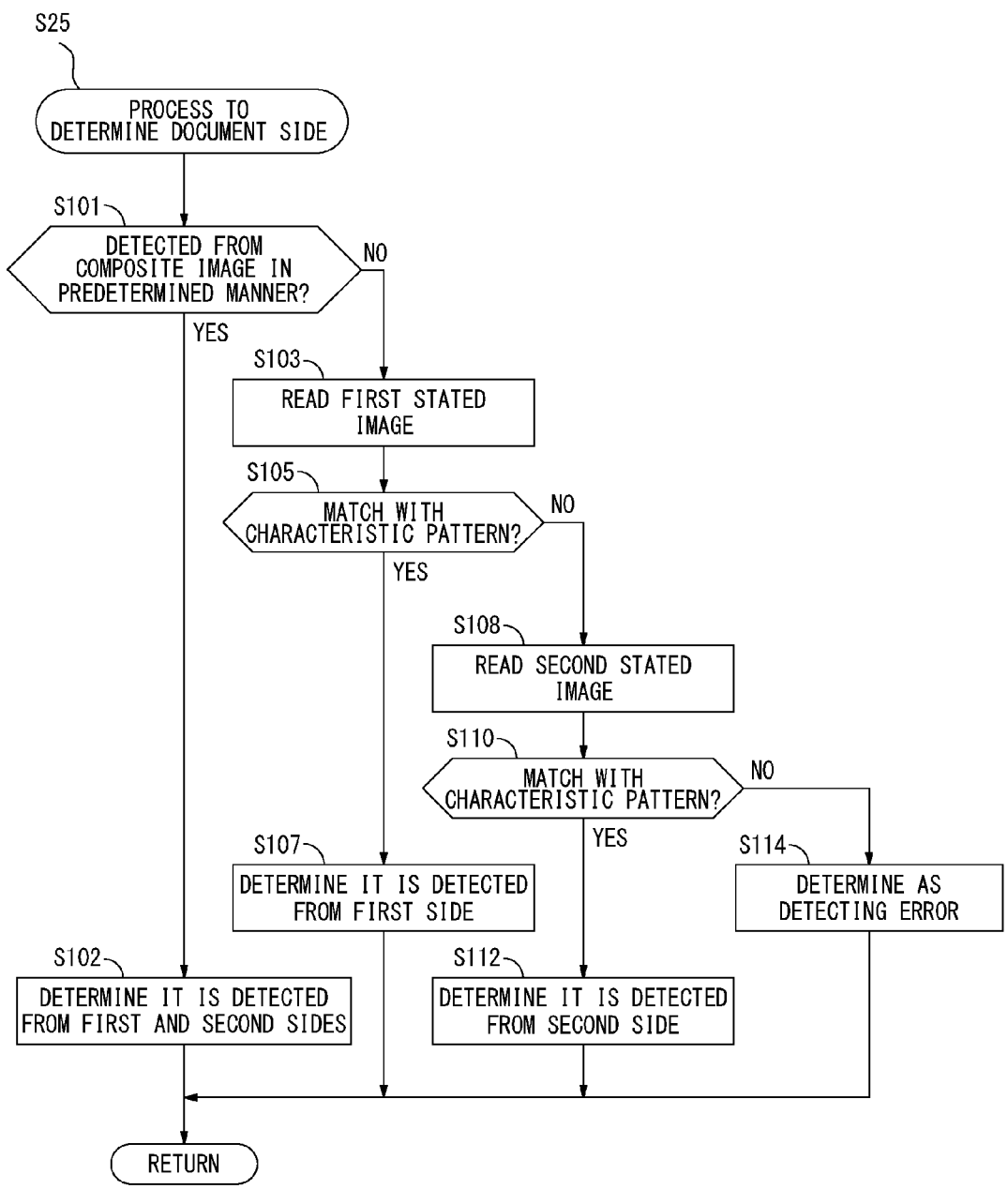

IMAGE READING DEVICE AND NON-TRANSITORY READABLE RECORDING MEDIUM

This application is based on the application No. 2015-051686 filed in Japan, the contents of which are hereby incorporated by reference.

BACKGROUND OF THE INVENTION

Field of the Invention

The present invention relates to an image reading device that includes a duplex parallel reading function and a non-transitory readable recording medium. The present invention more specifically relates to a technique of detecting a specific document.

Description of the Background Art

An image reading device that includes a function to read both sides of a document at the same time has an image reading unit for an obverse side and a back side of the document at a separate place from each other in a document path. Therefore, an image reading process is performed for each of the obverse and back side read at the image reading device. More specifically, in most cases, each processing unit that processes image data generated by reading the document is required for the obverse side and the back side of the document, respectively. Thus, two processing units are required for the entire device.

Some of the image reading devices have a function to determine whether or not the read document is one of specific documents such as a bank bill or securities. Some of the image reading devices are capable of restricting a forgery of the specific documents by terminating the reading process of the document when determining that the read document is one of the specific documents. The image reading device provided with the processing units for each of the obverse and back side of the document generally includes two processing units for each of the obverse and back side of the document for the determination process of the specific documents. In such a case, the number of the processing units necessary for the image reading device becomes large. A circuit size of the device becomes twice as large, and a structure of the device becomes complicated. Also, it is expensive to manufacture the devices.

An image processing device is known which is capable of reducing each image data of the obverse side and the back side of the read document in main scanning direction, and creating a linked image by lining and linking the two reduced image data. The image processing device then determines whether or not the linked image is the specific document. This known technique is introduced for example in Japanese Patent Application Laid-Open No. JP 2005-26880 A. According to the image processing device, only one processing unit that determines whether or not the image data is the specific document is enough, and two are unnecessary. The image processing device according to the known technique, however, has also some problems described below. FIGS. 16A, 16B and 16C show an example when obverse side image and back side image of the document are linked according to the known technique. FIG. 16A shows an example of characteristic patterns 101 and 102 for specific document determination that are embedded in the obverse side of the document. As shown in FIG. 16A, for example, the two characteristic patterns 101 and 102 are embedded in the obverse side of the document. A process to divide a whole image Ga into multiple blocks B100 corresponding to the size of the characteristic patterns 101 and 102 and determine one by one whether or not each block B100 includes an image component that forms at least a part of the characteristic patterns 101 and 102 is performed to detect the characteristic patterns 101 and 102 in the image Ga created by reading the obverse side of the document. FIG. 16B shows an example of a characteristic pattern 103 for the specific document determination that is embedded in the back side of the document, in an image Gb of the back side of the document. The images Ga and Gb of the obverse side and the back side of the document read by a reading unit, respectively, are reduced one by one and linked to each other as shown in FIG. 16C, then a single image Gc is created. One processing unit is required for the determination whether or not the created image Gc is the specific document.

In the known technique, when the two image data are compressed into half of their original size, respectively, the number of the blocks B100 that should be read for the detection of the characteristic patterns 101, 102 and 103 is no different from the two images of the obverse side and the back side. Then, the number of the blocks that should be read for creating the image Gc is still two, which is not changed. For performing the process to detect the characteristic pattern by the single processing unit, double the time is required as compared for the process performed for the single image.

SUMMARY OF THE INVENTION

The present invention is intended to solve the above problems. Thus, the present invention is intended to provide an image reading device and a non-transitory computer readable recording medium capable of controlling a time required for a determination as enabling a single determining processing unit to determine whether or not a read document is a specific document.

First, the present invention is directed to an image reading device.

According to one aspect of this invention, the image reading device comprises: a feeder that feeds a document along with a predetermined path; a first reading part that reads a first side of said document at a first position in said path and creates a first image; a second reading part that reads a second side of said document at a second position which is located posterior to said first position in said path and creates a second image; a synthesizing part that lays said first image and said second image on top of one another and creates a composite image; and a detecting part that detects a characteristic pattern of a specific document from said composite image created by said synthesizing part.

Second, the present invention is directed to a non-transitory computer readable recording medium storing a program to be executed by an image reading device that includes a feeder that feeds a document along with a predetermined path; a first reading part that reads a first side of said document at a first position in said path and creates a first image; and a second reading part that reads a second side of said document at a second position which is located posterior to said first position in said path and creates a second image.

According to one aspect of this invention, the program executed on said said image reading device to function as a system comprises: a synthesizing part that lays said first image and said second image on top of one another and creates a composite image; and a detecting part that detects a characteristic pattern of a specific document from said composite image created by said synthesizing part.

Third, the present invention is directed to an image reading method.

According to one aspect of this invention, the image reading method comprises: (a) feeding a document along with a predetermined path; (b) reading a first side of said document at a first position in said path and creating a first image; (c) reading a second side of said document at a second position which is located posterior to said first position in said path and creating a second image; (d) laying said first image and said second image on top of one another and creating a composite image; and (e) detecting a characteristic pattern of a specific document from said composite image created in said step (d).

BRIEF DESCRIPTION OF THE DRAWINGS

FIGS. 7A and 7B are timing charts when the reading timings of the first line image and the second line image are corrected;

FIG. 15 is a flow diagram explaining a detailed exemplary sequential procedure of a document side determining process;

DESCRIPTION OF THE PRESENT PREFERRED EMBODIMENTS

Figure 1A:
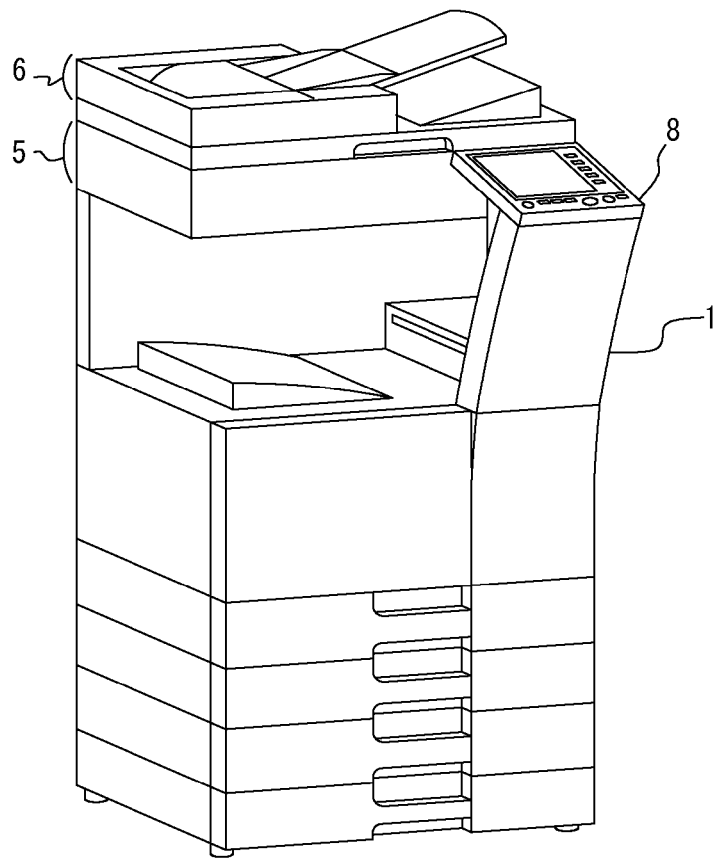
FIG. 1A shows an exemplary configuration of an image reading device capable of performing duplex parallel reading and FIG. 1B shows an enlarged scanner section.

A preferred embodiment of the present invention is described in detail below with reference to figures. In the description given below, those elements which are shared in common among figures are represented by the same reference numerals, and these elements are not discussed repeatedly for the same description.

Figure 1B:
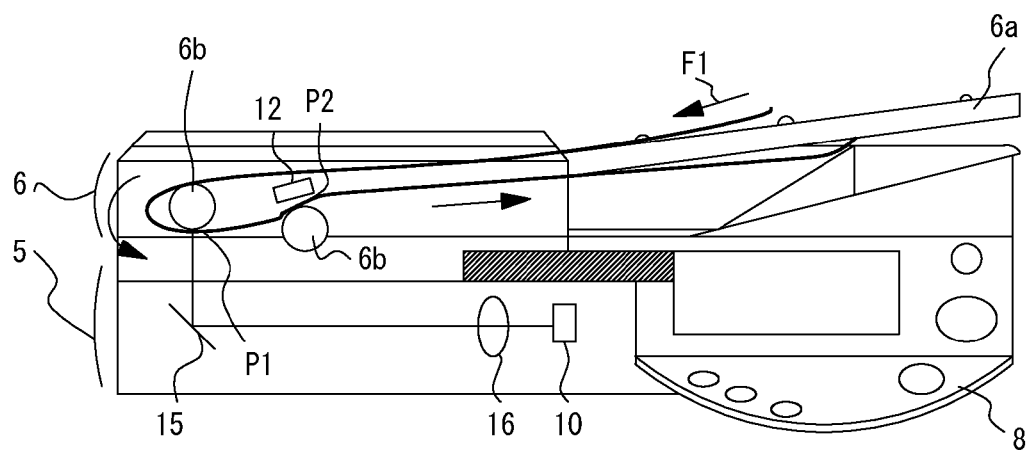

FIG. 1A shows an exemplary configuration of an image reading device 1 of the present preferred embodiment. The image reading device 1 is one of MFPs (Multifunctional Peripherals), for instance, and provided with a scanner section 5, an ADF (Auto Document Feeder) 6 and an operational panel 8. The scanner section 5 is capable of reading images, and the ADF 6 feeds a document along with a predetermined path. A user is allowed to operate the operational panel 8. FIG. 1B shows the enlarged scanner section 5 and ADF 6. The scanner section 5 includes a first imaging unit 10 and a second imaging unit 12. The first imaging unit 10 is formed from a device such as a CCD (Charge Coupled Device) that is capable of reading an image of one side of the document. The first imaging unit 10 is capable of reading a color document and a black-and-white document. The second imaging unit 12 is formed from a device such as a CIS (Contact Image Sensor) that is capable of reading an image of the other side of the document. The second imaging unit 12 is capable of reading the color document and the black-and-white document as well as the first imaging unit 10. The ADF 6 includes a document tray 6a and a feeding roller 6b.

The document put into the document tray 6a is taken out by a pick up roller, which is not shown in FIG. 1B, and passed in a direction shown with an arrow F1, then fed by the feeding roller 6b. After passing a first imaging position P1 in the path, the document is passed out into a catch position by passing through a second imaging position P2. In the path, an irradiation lamp, which is not shown in FIG. 1B, exposes a light on the one side of the document and a reflected light fell on the first imaging unit 10 through a mirror 15 and a lens 16, then the image of one side of the document is read at the first imaging position P1. The image of the other side is then read by the second imaging unit 12 at the second imaging position P2 which is located posterior to the first imaging position P1 in the path.

As an example of the process at the image reading device 1, after the images of the both sides of the document are created, a single composite image is created by laying the image of one side and the image of the other side on top of one another, and a characteristic pattern of a specific document is detected from the created composite image. When the image of one side and the image of the other side are laid on top of one another and the images are synthesized, there is no difference in the number of the blocks that form the image because a process such as a data compression is not performed. More specifically, an addition synthesizing process is performed for each corresponding block by laying the two images on top of one another. The number of the blocks therefore does not change. The number of the blocks to be processed for the determination whether or not the characteristic pattern of the specific document is included in the created composite image is the same as the number of the blocks of the single image. The determination of the characteristic pattern may be performed in the process time the same as the single image.

Figure 2:
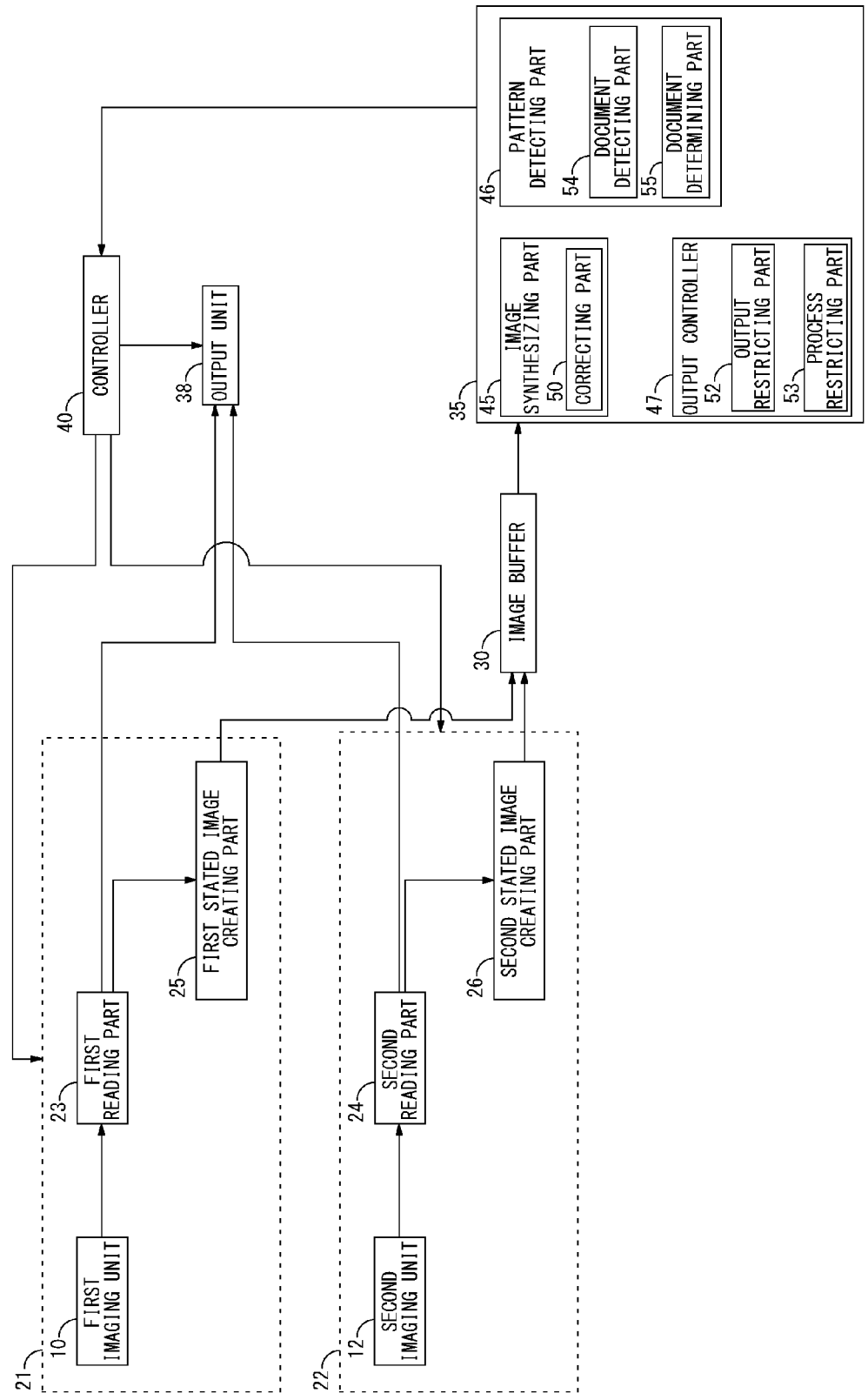
FIG. 2 is a block diagram showing an example of a hardware structure and that of a functional structure of the image reading device of a present preferred embodiment.

FIG. 2 is a block diagram showing an example of a hardware structure and that of a functional structure of the image reading device 1. The image reading device 1 includes a first reading unit 21, a second reading unit 22, an image buffer 30, a CPU 35, a controller 40 and an output unit 38. The first reading unit 21 reads the first side of the document and the second reading unit 22 reads the second side of the document. The images created by the first reading unit 21 and the second reading unit 22 are stored in the image buffer 30. The CPU 35 reads the image in the image buffer 30 and determines whether or not the characteristic pattern is included. The controller 40 controls the image reading process at the image reading device 1 in response to the request from the CPU 35. The created image is output by the output unit 38.

The first reading unit 21 includes the first imaging unit 10, a first reading part 23 and a first stated image creating part 25. The first reading part 23 reads the first side of the document at the first imaging position P1 in the path feeding the document and creates the first image. The first reading part 23 converts an analog signal obtained by the first imaging unit 10 by reading the document into a digital signal. The first reading part 23 sends the created first image data to the first stated image creating part 25. The first stated image creating part 25 extracts an image component that has an image characteristic of the characteristic pattern of the specific document from the first image and creates the first stated image. The first stated image creating part 25 reads characteristic pattern information relating to the characteristic pattern stored in a storage, which is not shown in FIG. 2, and extracts the component to be the characteristic of the characteristic pattern from the first image, thereby creating the first stated image.

Figure 3A:
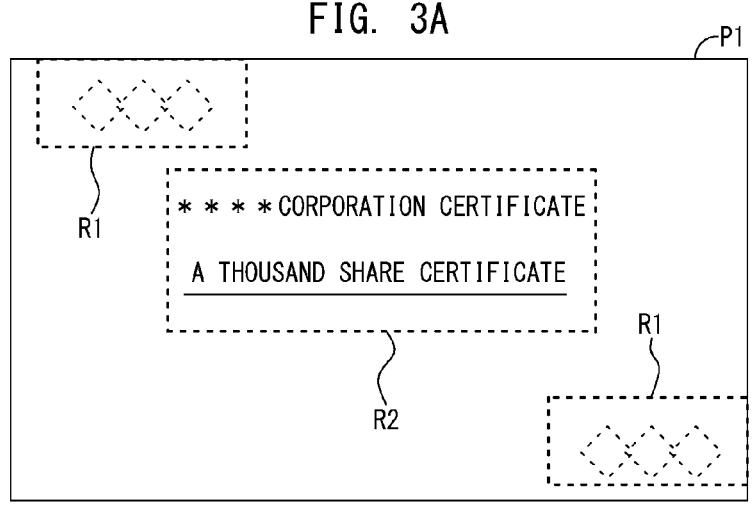
FIG. 3A is an exemplary configuration of a first side.
Figure 3B:
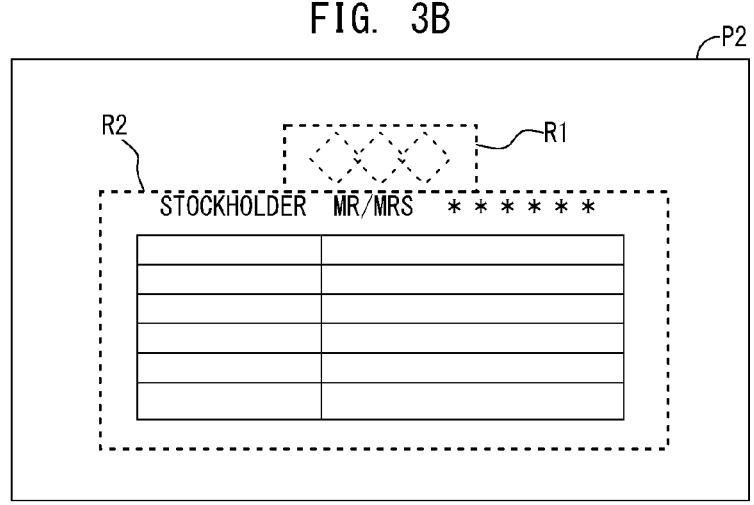
FIG. 3B is an exemplary configuration of a second side of a specific document and FIG. 3C is an exemplary configuration of a composite image.
Figure 3C:
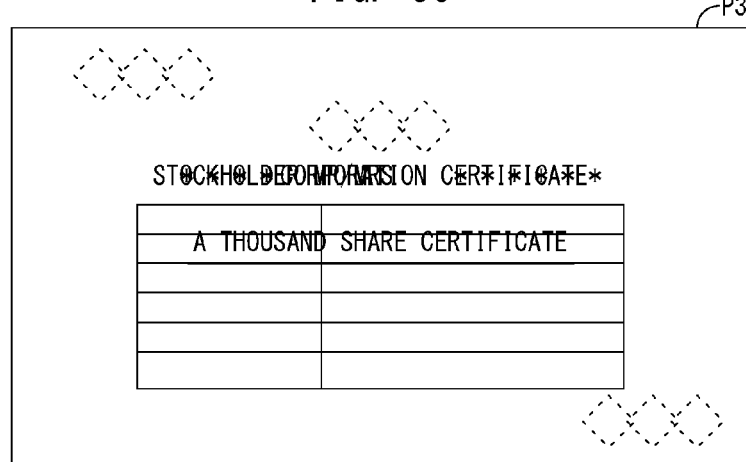
Figure 4A:
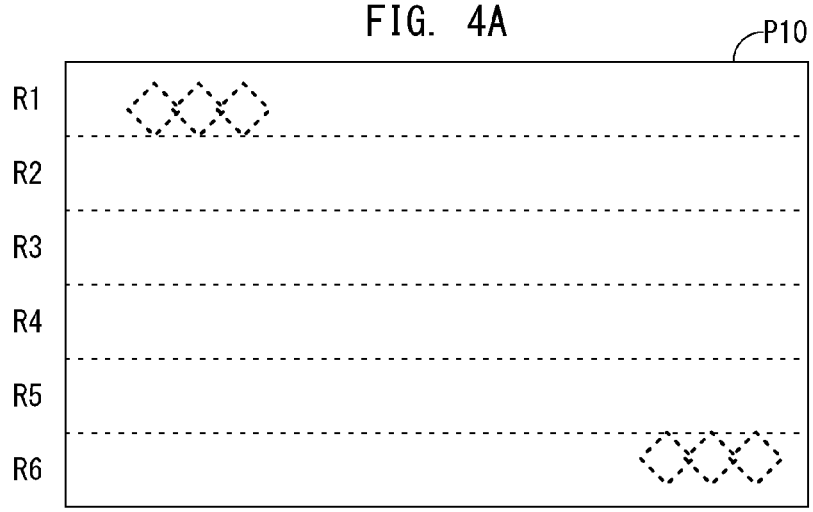
FIGS. 4A, 4B and 4C show an example when the composite image is created by extracting an image component of a characteristic pattern embedded in the specific document.

FIGS. 3A, 3B and 3C show examples of the images created by reading the one side (the first side) and the other side (the second side) of the document. In the examples, the specific document is a stock certificate. FIG. 3A is an exemplary configuration of a first image P1 created by reading the one side (the first side) of the specific document by the first reading part 23. A characteristic pattern R1 and a body R2 that shows a body of the document are contained in the first image P1. As the body of the document, information including an indication that shows the document is the stock certificate, the detail of the right, an owner or an assignment history of the stock certificate is contained if the document is the stock certificate. The characteristic pattern R1 is generally shown in the document in a manner that is difficult for people to view. FIG. 4A shows an example how the first stated image created by the first stated image creating part 25 by extracting the image component that has the image characteristic of the characteristic pattern R1 from the first image is shown. Only the component having the predetermined image characteristic of the characteristic pattern R1 is extracted from the first image P1 and a first stated image P10 of FIG. 4A is created. The first stated image creating part 25 extracts the image component that has the image characteristic of the characteristic pattern R1 from the first image P1 and creates the first stated image, thereby capable of determining whether or not the document is the specific document in a short time compared to the first image.

A color component, for instance, can be one of examples of the image characteristic of the characteristic pattern R1 used for the creation of the first stated image by the first stated image creating part 25. In this case, the first stated image creating part 25 extracts the color component of the characteristic pattern from the first image P1 and creates the first stated image. By extracting the color component of the characteristic pattern and creating the first stated image, the first stated image that does not contain the color component different from that of the characteristic pattern is created. Thus, the data size of the first stated image can be reduced, and the storage capacity of the image buffer 30 for storing the first stated image in the image buffer 30 may be decreased.

Different from what is described above, the first stated image creating part 25 is capable of using a frequency component as the image characteristic of the characteristic pattern R1. To be more specific, the characteristic pattern is included in a predetermined frequency domain in the space frequency domain of the first image P1 in many cases. By extracting the image with the predetermined frequency component from the first image P1, the image containing the characteristic pattern R1 is allowed to be extracted. In this case, the first stated image creating part 25 extracts the frequency component of the characteristic pattern from the first image and creates the first stated image. The characteristic pattern R1 is shown by a predetermined frequency on the specific document. The first stated image creating part 25 is capable of extracting only the image component that matches with the frequency of the characteristic pattern R1 of the images displayed as the first image by using a filter. As a result, the data size of the first stated image can be reduced. Also, the characteristic pattern may be detected in a shorter time compared to detect the characteristic pattern from the first image.

The second reading unit 22 includes the second imaging unit 12, a second reading part 24 and a second stated image creating part 26. The second reading part 24 obtains the analog data generated by reading the other side (the second side) of the document from the second imaging unit 12, and converts the obtained analog data into the digital data. The second reading part 24 sends the created second image to the second stated image creating part 26 as well as the first reading part 23. The second stated image creating part 26 extracts the image component that has the image characteristic of the characteristic pattern from the second image and creates the second stated image. The second stated image creating part 26 uses the color component as the image characteristic of the characteristic pattern as well as the first stated image creating part 25. The second stated image creating part 26 extracts the image component from the second image and creates the second stated image. Alternatively, the second stated image creating part 26 is capable of using the frequency component as the image characteristic of the characteristic pattern. The second stated image creating part 26 extracts the image component of the frequency the same as the frequency of the characteristic pattern from the second image, thereby creating the second stated image.

The image buffer 30 is constructed by a device such as a memory capable of storing therein multiple lines of the images, for example. The image buffer 30 is a storage region in which the first image created by the first reading part 23 and the second image created by the second reading part 24 are stored. The first reading part 23 and the second reading part 24 read the first and the second sides along with a predetermined reading line, respectively, and create a first line image and a second line image that form the first image and the second image. The first reading part 23 and the second reading part 24 then store the created images in the image buffer 30. Alternatively, the first stated image creating part 25 and the second stated image creating part 26 may create the first stated image and the second stated image that correspond to the first line image and the second line image and store them in the image buffer 30. The line images are stored in the image buffer 30. As a result, every time the predetermined number of the line images are stored in the image buffer 30, an image synthesizing part 45 reads and creates a composite band image that forms the composite image. As a result, even before the first side or the second side is read, the characteristic pattern can be detected with the composite band image. Then, the characteristic pattern can be detected at an early stage when the specific document is read. The later process is allowed to be terminated.

The CPU 35 executes a program stored in a storage, which is not shown in FIG. 2, thereby serving as the image synthesizing part 45, a pattern detecting part 46 and an output controller 47. The image synthesizing part 45 synthesizes the first and the second images created by reading the first and the second sides, thereby creating the composite image. The pattern detecting part 46 detects the characteristic pattern of the specific document from the composite image, and the output controller 47 controls the output when the characteristic pattern is detected by the pattern detecting part 46.

The image synthesizing part 45 lays the first image and the second image on top of one another, thereby creating the composite image. The first image and the second image are created and stored in the image buffer 30 by the first reading part 23 and the second reading part 24, respectively. In this case, the image synthesizing part 45 reads the first and the second images in the image buffer 30 and creates the composite image. As illustrated in FIGS. 3A, 3B and 3C, the image synthesizing part 45 lays the first image P1 of FIG. 3A and the second image P2 of FIG. 3B on top of one another, and creates the composite image P3 of FIG. 3C. For creation of the composite image P3, the data of the first image P1 and the second image P2 is not reduced so that the number of the data block of the single image is not changed. As a result, the process time required for reading the composite image and detecting the characteristic pattern is the same as the time required for the single image.

Figure 4B:
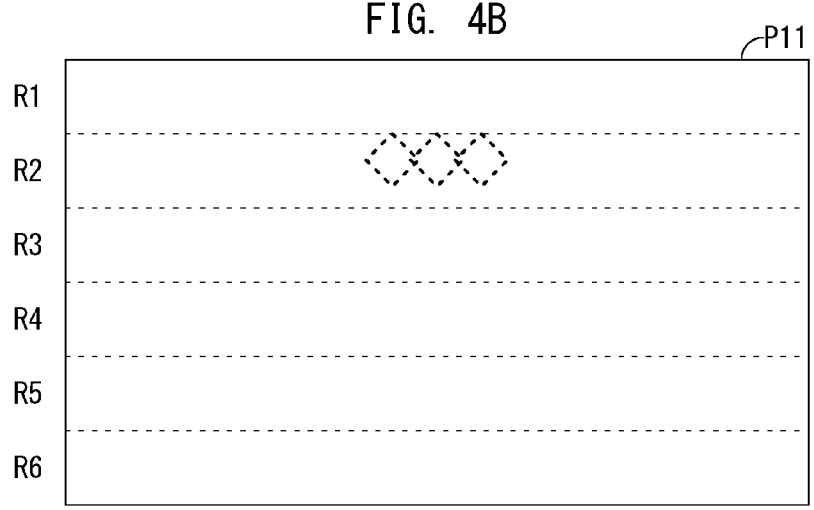
Figure 4C:
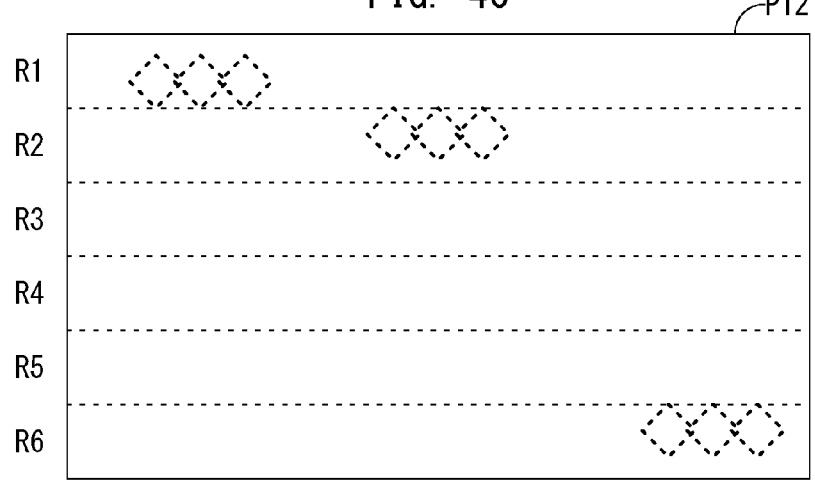

The image component having the image characteristic of the first and the second images is extracted and the first stated image and the second stated image are created by the first stated image creating part 25 and the second stated image creating part 26. In this case, the first stated image creating part 25 and the second stated image creating part 26 store the created first stated image and second stated image in the image buffer 30. The image synthesizing part 45 may read the first stated image and the second stated image in the image buffer 30 and lay the first stated image and the second stated image on top of one another, thereby creating the composite image. FIG. 4A shows an example of the first stated image P10 created by the first stated image creating part 25, and FIG. 4B shows an example of the second stated image P11 created by the second stated image creating part 26. As illustrated in FIG. 4C, the image synthesizing part 45 lays the first stated image and the second stated image on top of one another to create the composite image. Compared to the case where the composite image P3 is created by laying the first image P1 and the second image P2 on top of one another, the data amount of the composite image is smaller when the composite image P12 is created by laying the first stated image P10 and the second stated image P11 on top of one another. Thus, the time required for the pattern detecting part 46 to detect whether or not the characteristic pattern is contained in the composite image P12 is allowed to be shortened.

The first reading part 23 and the second reading part 24 read the first side and the second side along with the predetermined reading line and create the first line image and the second line image that form the first image and the second image, respectively. In this case, the image synthesizing part 45 reads the first line image or the second line image in the image buffer 30 and creates the composite band image. When the first image and the second image are created along with the predetermined reading line, respectively, the first stated image creating part 25 and the second stated image creating part 26 create the first stated image and the second stated image corresponding to the first line image and the second line image. As shown in FIGS. 4A, 4B and 4C, for example, the first stated image and the second stated image are formed from each image, reading line R1 to R6.

The composite image of FIG. 4C is also formed from each image, the reading line R1 to R6. The first reading part 23 and the second reading part 24 read the first side and the second side along with the predetermined reading lines and create the first line image and the second line image, respectively. The first stated image creating part 25 and the second stated image creating part 26 then create a first stated line image and a second stated line image corresponding to the first line image and the second line image. The first stated image creating part 25 and the second stated image creating part 26 store the first stated line image and the second stated line image in the image buffer 30. The image synthesizing part 45 reads the predetermined lines of the first stated line images or the second line stated images and creates the composite band image. After the image synthesizing part 45 creates the composite band image, the pattern detecting part 46 detects the characteristic pattern from the composite band image. To be more specific, the characteristic pattern is detected from each composite band image. Thus, the characteristic pattern is sometimes detected before the reading operation of the document complete. In such a case, the document is determined as the specific document before completion of the reading operation of the document. Based on this determination, the reading operation can be terminated immediately.

Figure 5:
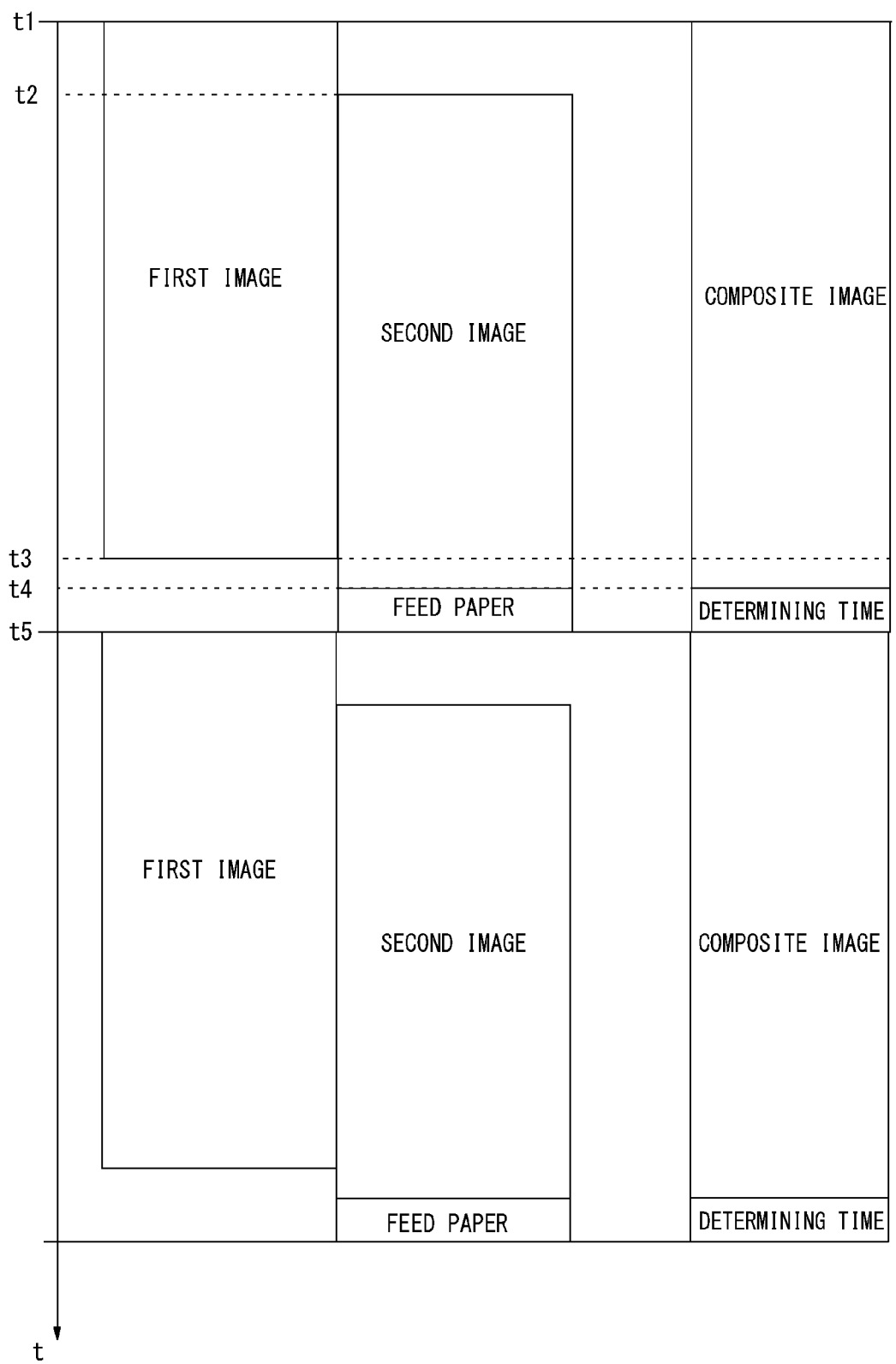
FIG. 5 is a timing chart that shows an exemplary timing to read the first side and the second side of the document and create the composite image.

After the predetermined lines of the first line images or the second line images are stored in the image buffer 30, the image synthesizing part 45 may read the stored first line image or second line image and create the composite band image. FIG. 5 is a timing chart that shows a timing of creation of the first image, the second image and the composite image. The first imaging position P1 to read the first side is placed anterior to the second imaging position P2 to read the second side so that the first side is read before the second side. The creation of the first line image is started at timing t1. After the creation of the first line image is started, the image synthesizing part 45 reads the predetermined number of the first line images in the image buffer 30 and starts creating the composite band image. Thus, the creation of the composite band image is also started at timing t1.

As the document is reached the second imaging position P2 at timing t2, the second reading part 24 starts creating the second line image. From timing t2 to t3, the first line image and the second line image are created and stored in the image buffer 30, respectively. The image synthesizing part 45 then reads the predetermined number of the first line images and the second line images in the image buffer and creates the composite band image from timing t2 to t3. After the reading of the first side of the document, the first line image is created at timing t3. The reading of the second side of the document is then complete, and the second line image is created at timing t4. After creation of the second line image, the creation of the composite band image is also complete. From timing t4 to t5, the document is fed and passed out into the catch position. The pattern detecting part 46 detects the characteristic pattern from the composite band image in the last line (determining time). The multiple sheets of the document may be read continuously. In this case, the next document has been fed to the first imaging position P1 and the previous document has been passed out from timing t4 to t5. After the detection of the characteristic pattern is performed for the composite band image in the last line, the reading operation of the next document is started and the creation of the first band image is started. More specifically, when the image synthesizing part 45 does not read the first band image and the second band image at the same time, creation of the composite band image may be started at almost the same time as the timing when the creation of the first band image is started.

Figure 6:
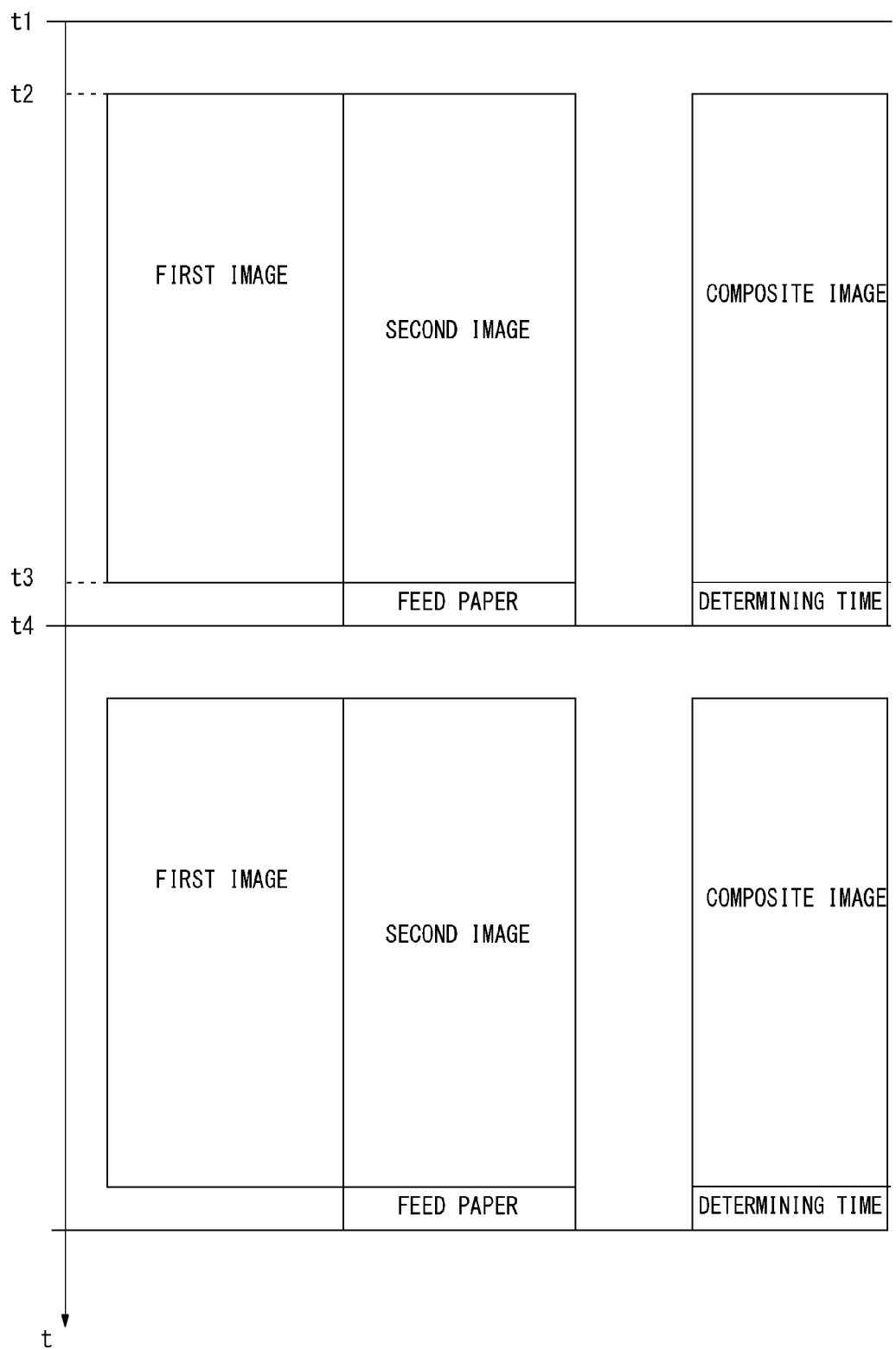
FIG. 6 is a timing chart that shows an example when the timings to read the first side and the second side of the document and create the composite image are synchronized.

A correcting part 50 corrects a difference between the timing to begin the creation of the first image and the timing to begin the creation of the second image. The correcting part 50 synchronizes the timing to read the first first line image with the timing to read the first second line image and reads the images in the image buffer. In this case, the image synthesizing part 45 synthesizes the first first line image and the first second line image read by the correcting part 50, thereby creating the first composite band image. FIG. 6 is a timing chart that shows an example when the timing to begin creation of the first line image is corrected to the timing to begin creation of the second line image. The document reaches the first imaging position P1 at timing t1. The first reading part 23 starts creating the first line image and stores the created first line image in the image buffer 30. The document, however, has not reached the second imaging position P2 which is placed posterior to the first imaging position P1 in the path so that the second reading part 24 is not allowed to start creation of the second line image. The correcting part 50 does not read the first line image stored in the image buffer 30 until the timing to read the second line image. As the document reaches the second imaging position P2 at timing t2, the second reading part 24 starts creating the second line image and stores the created second line image in the image buffer. Thus, the second line image is allowed to be read too. The correcting part 50 then reads the first first line image and the first second line image. The image synthesizing part 45 synthesizes the first first line image and the first second line image and creates the first composite band image. As a result, the composite band image is created without having any shift between the first line image and the second line image. Thus, the first line image and the second line image are justified with the composite band image so that the pattern detecting part 46 is allowed to perform the detecting process successfully. When the reading timings of the first line image and the second line image are synchronized, the timing to complete the creation of the second line image and the timing to complete the creation the first line image are synchronized. By comparing the complete time of the reading operation in case where the timings are synchronized with in case where the timings are not synchronized as shown in FIG. 5, the reading operation completes almost the same time in both cases. As a result, even when the difference between the timings of the first image and the second image is corrected by the correcting part 50, the reading operation of the document is not delayed.

One of the first line image and the second line image may be allowed to be read but not another. In this case, the correcting part 50 serves as a line correcting part that reads the first line image and the second line image in the image buffer 30 after waiting until the timing when both of the first line image and the second line image are allowed to be read. FIGS. 7A and 7B are an example of correcting the reading timing of the first line image and the second line image. In the example of FIG. 7A, the predetermined number of the first line images are read at every predetermined timing and the composite band image is created. After the first line image and the second line image are read at timing t1, the second line image is read and a composite band image GB1 is created even though the number of the second line images has not reached the predetermined number. A composite ratio of the first line image and the second line image to the composite band image GB1 is different from that to the other composite band image. In order to avoid this, the second line image is not read at timing t1 as shown in FIG. 7B. Only the first line image is read and the composite band image is created at timing t1. When both the first line image and the second line image are allowed to be read at timing t2, the correcting part 50 reads the first line image and the second line image in the image buffer 30, and the image synthesizing part 45 creates the composite band image GB2. As a result, the composite ratios of the first line image and the second line image to the created composite band image GB2 are equal.

The pattern detecting part 46 includes a document detecting part 54 and a document determining part 55. When the characteristic pattern is detected from the composite image, the document detecting part 54 detects the characteristic pattern from each of the first image and the second image. The document determining part 55 determines the side of the document from which the characteristic pattern is detected based on the detecting result by the document detecting part 54. The pattern detecting part 46 may detect the characteristic pattern from the composite image. In this case, the document detecting part 54 performs a process to detect the characteristic pattern for each of the first and the second images in order to identify the characteristic pattern is shown in either of the first and the second images that are laid on top of one another in the composite image. The document determining part 55 determines that the characteristic pattern is detected from either of the first side or the second side of the document based on the detecting result by the document detecting part 54.

Figure 8A:
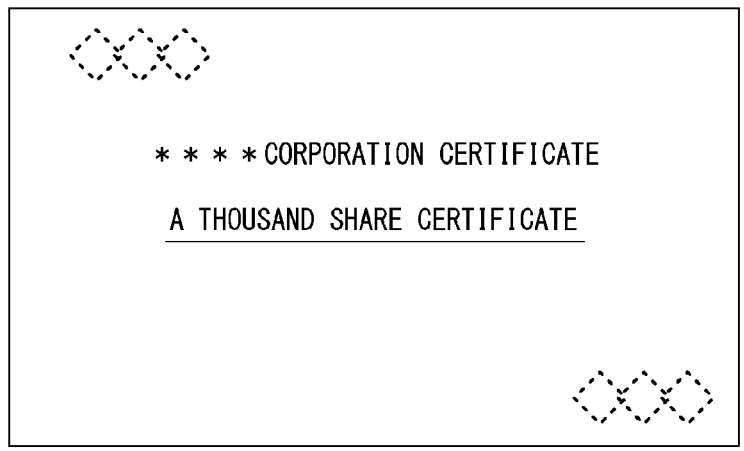
FIGS. 8A, 8B and 8C are an example when the characteristic pattern is displayed in a manner different from usual in the composite image.
Figure 8B:
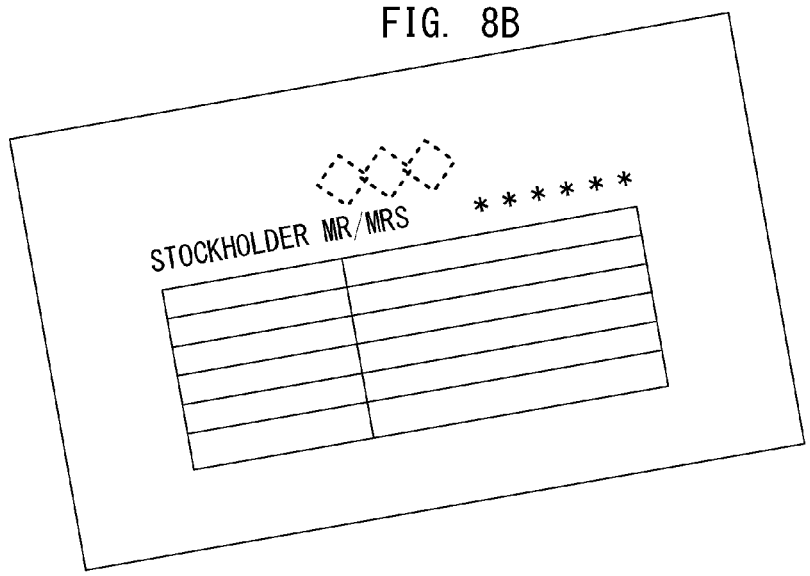
Figure 8C:
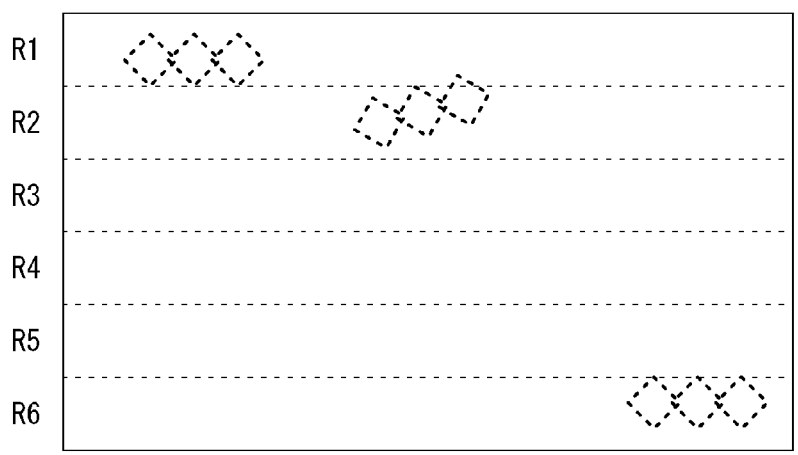

When the document detecting part 54 detects the characteristic pattern from the first image, the document determining part 55 determines that the characteristic pattern is detected from the first side. When the document detecting part 54 detects the characteristic pattern from the second image, the document determining part 55 determines that the characteristic pattern is detected from the second side. The document determining part 55 may determine that the characteristic pattern is detected from the first and the second side when the characteristic pattern detected from the composite image is in a predetermined manner. FIGS. 8A, 8B and 8C are an example when the two sheets of the document are laid on top of one another and read at the image reading device 1. FIG. 8A shows the first image of the specific document and FIG. 8B shows the second image of the specific document. One of the two sheets of the document is passed obliquely and read at the document feeding so that the second image is inclined. Two phases of characteristic patterns are detected from the composite image created by synthesizing the first image and the second image as shown in FIG. 8C. To be more specific, as the second image is passed obliquely and read, the characteristic pattern contained in the second image is also read obliquely. When multiple phases of the characteristic patterns are detected as shown in FIG. 8C, for example, the document determining part 55 determines that the characteristic patterns are shown in both of the first and the second sides of the document.

Figure 9A:
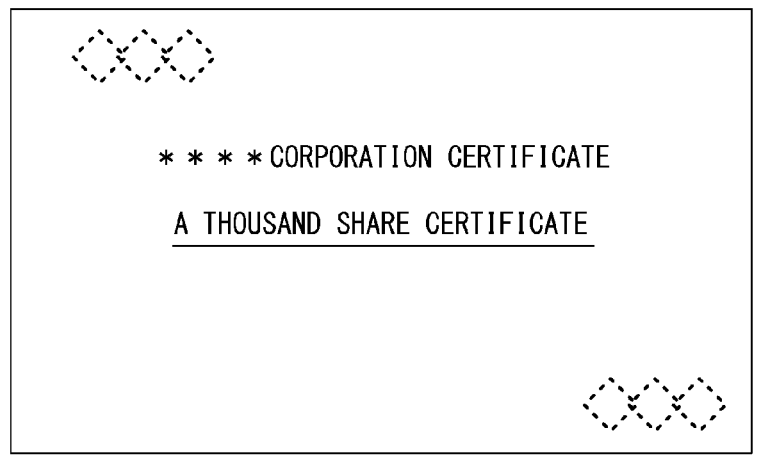
FIGS. 9A, 9B and 9C are an example when the characteristic pattern is displayed in a manner different from usual in the composite image.
Figure 9B:
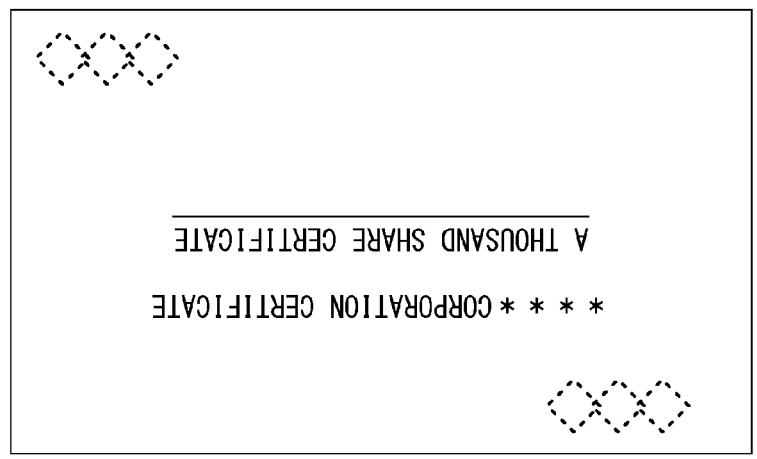
Figure 9C:
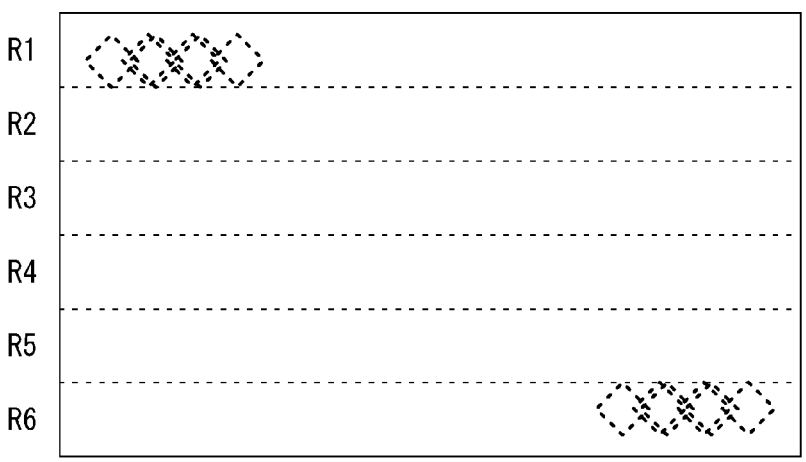

FIGS. 9A, 9B and 9C are an example when the different documents showing the characteristic pattern are laid on top of one another and read at the image reading device 1. The specific document is the stock certificate as an example. FIG. 9A shows the first image and FIG. 9B shows the second image. Two sheets of the stock certificates are laid upside down and read as a single document at the image reading device 1. That is why the second image is created upside down. In the composite image of FIG. 9C, the characteristic pattern shown in the first image is laid on the characteristic pattern shown in the second image. Thus, when the multiple characteristic patterns are shown in a manner that they are laid on top of one another in the composite image, the document determining part 55 determines that the characteristic pattern is shown in both of the first and the second images. This is based on the premise that the characteristic pattern is not shown at the same position from the front view in the specific document that has the characteristic patterns on the first side and the second side. Based on the aforementioned premise, when the characteristic patterns are shown on both sides of the single specific document, the characteristic patterns of the composite image are not laid on top of one another. In order to lay the characteristic patterns of the composite image on top of one another, it is determined that the multiple specific documents are laid and read at the image reading device 1 but not the single specific document. As a result, when the multiple characteristic patterns of the composite image are shown to be laid on top of one another, the document determining part 55 determines that the characteristic pattern is detected from the first side and the second side.

The output controller 47 includes an output restricting part 52 and a process restricting part 53. The output restricting part 52 restricts the output from the output unit 38 when the characteristic pattern is detected from the composite image by the pattern detecting part 46. The output of the specific document from the printer section or transmission of the specific document from the fax section may be restricted. The process restricting part 53 restricts the creation of the first image or the second image by the first reading unit 23 or the second reading unit 24 when the characteristic pattern is detected from the composite image by the pattern detecting part 46. The output restricting part 52 and the process restricting part 53 send a terminating request to the controller 40 that is capable of terminating the process at each unit, for example, thereby terminating the output and the creation of the image when the characteristic pattern is detected by the pattern detecting part 46.

Figure 10:
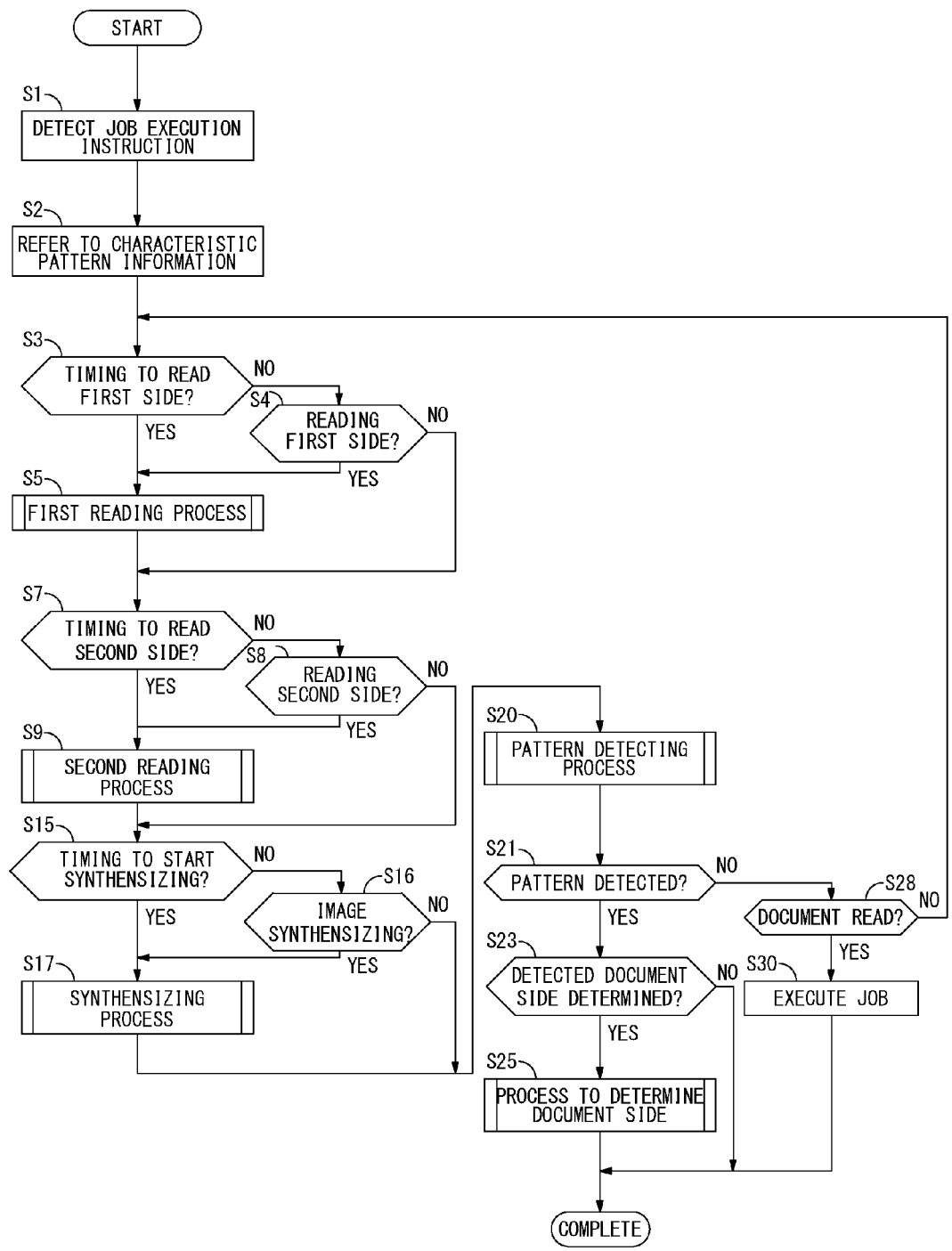
FIG. 10 is a flow diagram explaining an exemplary sequential procedure of the main process performed at the image reading device of the present preferred embodiment.

The sequential procedure of the process at the image reading device 1 of the present preferred embodiment is described next. FIG. 10 is a flow diagram explaining an exemplary sequential procedure of the main process performed at the image reading device 1. After detecting a job execution instruction (step S1), the image reading device 1 refers the characteristic pattern information (not shown in any figure) stored in the storage (step S2). The image reading device 1 then determines if it is the timing to start reading the first side of the document (step S3). The image reading device 1 may determine it is the timing to start reading the first side (when a result of step S3 is YES). In this case, the image reading device 1 performs the first reading process to read the first side (step S5). The image reading device 1 may determine it is not the timing to start reading the first side (when a result of step S3 is NO). In this case, the image reading device 1 determines whether or not it is during the reading operation of the first side (step S4). When determining it is during the reading operation of the first side (when a result of step S4 is YES), the image reading device 1 performs the first reading process. When determining it is not during the reading operation of the first side (when a result of step S4 is NO), the image reading device 1 skips the first reading process. The detail of the first reading process is described later.

The image reading device 1 determines if it is the timing to start reading the second side of the document (step S7). The image reading device 1 may determine it is the timing to start reading the second side (when a result of step S7 is YES). In this case, the image reading device 1 performs the second reading process to read the second side (step S9). The image reading device 1 may determine it is not the timing to start reading the second side (when a result of step S7 is NO). In this case, the image reading device 1 determines whether or not it is during the reading operation of the second side (step S8). When determining it is during the reading operation of the second side (when a result of step S8 is YES), the image reading device 1 performs the second reading process. When determining it is not during the reading operation of the second side (when a result of step S8 is NO), the image reading device 1 skips the second reading process. The detail of the second reading process is described later.

The image reading device 1 determines if it is the timing to start creating the composite image (step S15). The image reading device 1 may determine it is the timing to start (when a result of step S15 is YES). In this case, the image reading device 1 performs the process to create the composite image (step S17). The image reading device 1 may determine it is not the timing to start creating the composite image (when a result of step S15 is NO). In this case, the image reading device 1 determines whether or not it is during the creation of the composite image (step S16). When determining it is during the creation of the composite image (when a result of step S16 is YES), the image reading device 1 performs the synthesizing process. When determining it is not during the creation of the composite image (when a result of step S16 is NO), the image reading device 1 skips the synthesizing process. The detail of the synthesizing process is described later. After the synthesizing process, the image reading device 1 performs the pattern detecting process to detect the characteristic pattern (step S20). The image reading device 1 determines whether or not the characteristic pattern is detected (step S21). The image reading device 1 may determine that the characteristic pattern is not detected (when a result of step S21 is NO). In this case, the image reading device 1 determines if the reading operation is complete (step S28). When determining the reading operation is complete (when a result of step S28 is YES), it can be said the document is not the specific document. The image reading device 1, therefore, executes the job (step S30) and completes the process. When determining that the reading operation is not complete (when a result of step S28 is NO), the image reading device 1 returns to the process in step S3 and repeats the process from the first reading process.

The image reading device 1 may determine that the characteristic pattern is detected (when a result of step S21 is YES). In this case, the image reading device 1 determines whether or not to determine that the characteristic pattern is detected from which the side of the document (step S23). When the image reading device 1 determines (when a result of step S23 is YES), it performs the process to determine the side of the document (step S25) and completes the process. When the image reading device 1 does not determine (when a result of step S23 is NO), it skips the process to determine the side of the document and completes the process.

Figure 11A:
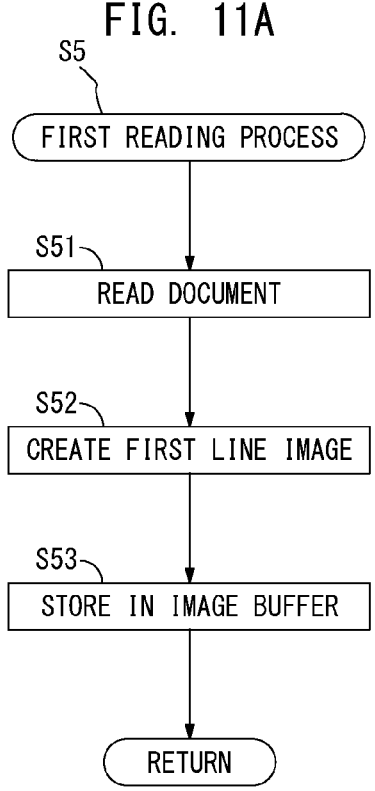
FIG. 11A is a flow diagram explaining a detailed exemplary sequential procedure of a first reading process and FIG. 11B is a flow diagram explaining a detailed exemplary sequential procedure of a second reading process.

FIG. 11A is a flow diagram explaining a detailed exemplary sequential procedure of the first reading process (step S5 in FIG. 10). The image reading device 1 reads the first side of the document (step S51) and reads along with the predetermined reading line, thereby creating the first line image (step S52). The image reading device 1 then stores the created image in the image buffer (storage) (step S53) and completes the process.

Figure 11B:
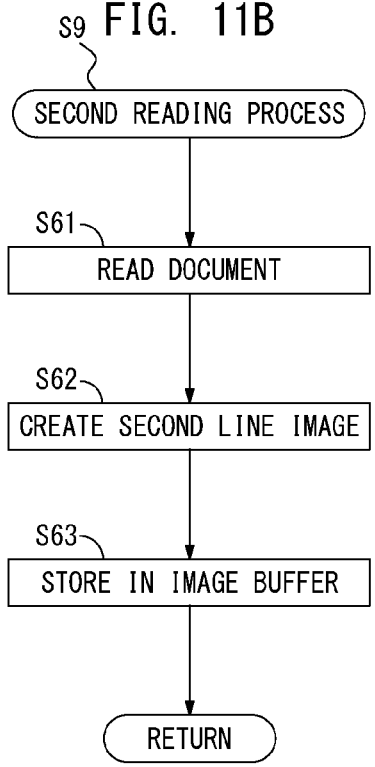

FIG. 11B is a flow diagram explaining a detailed exemplary sequential procedure of the second reading process (step S9 in FIG. 10). The image reading device 1 reads the second side of the document (step S61) and reads along with the predetermined reading line, thereby creating the second line image (step S62). The image reading device 1 then stores the created second line image in the image buffer and completes the process (step S63).

Figure 12:
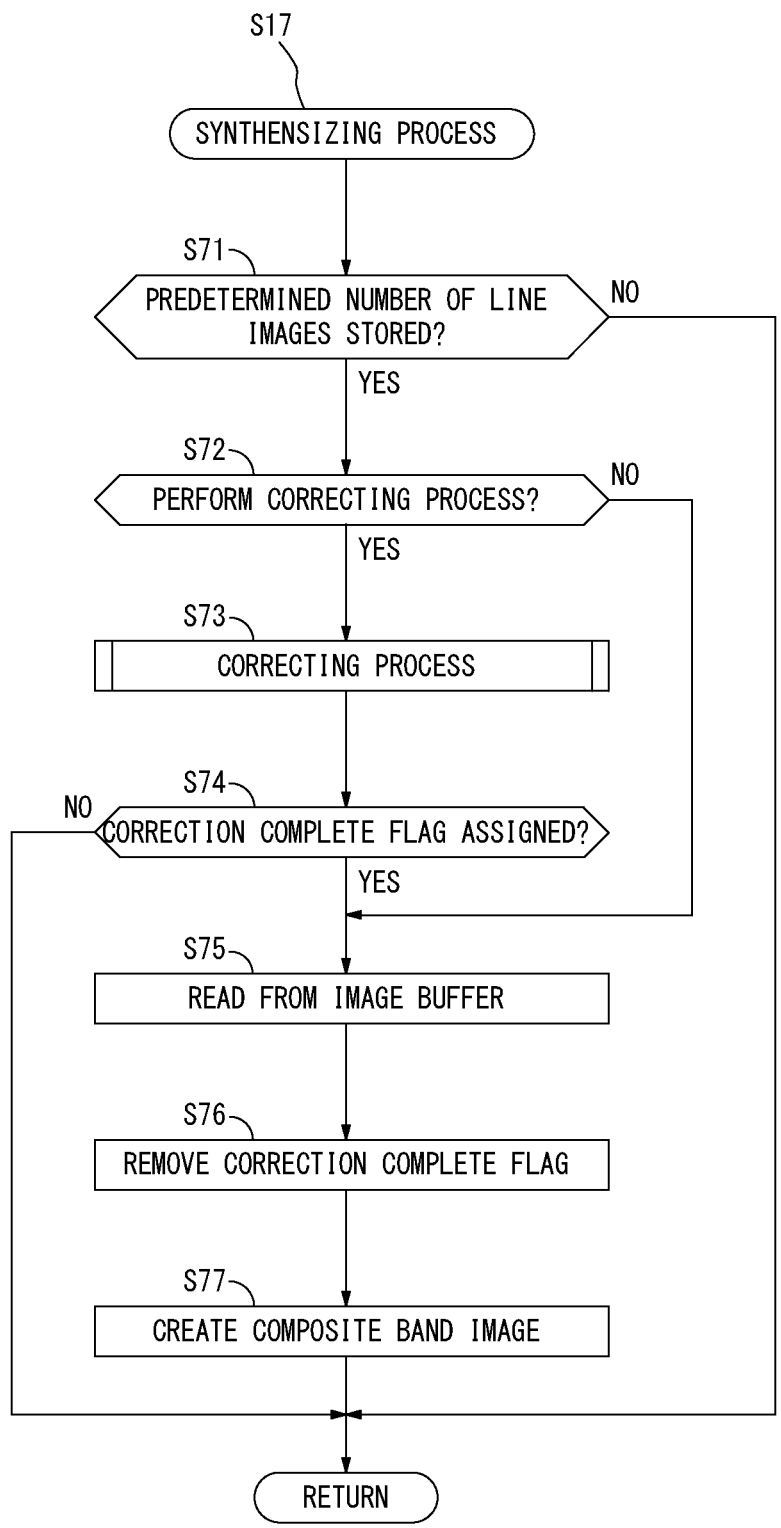
FIG. 12 is a flow diagram explaining a detailed exemplary sequential procedure of a synthesizing process.

FIG. 12 is a flow diagram explaining a detailed exemplary sequential procedure of the synthesizing process (step S17 in FIG. 10). The image reading device 1 determines if the predetermined number of the first line images or the second line images are stored in the image buffer 30 (step S71). When determining the predetermined number of the first line images or the second line images are not stored (when a result of step S71 is NO), the synthesizing process is complete. When determining the predetermined number of the first line images or the second line images are stored (when a result of step S71 is YES), the image reading device 1 determines whether or not to perform the correcting process to synchronize the timing to read the first line image and the timing to read the second line image (step S72). In response to determining to perform the correcting process (when a result of step S72 is YES), the image reading device 1 performs the correcting process (step S73). The detail of the sequential procedure of the correcting process is described later. After the correcting process, the image reading device 1 determines if a correction complete flag is assigned (step S74). To be more specific, in the correcting process, the timings to read the first line image and the second line image are synchronized and the correction complete flag is assigned (when a result of step S74 is YES). In this case, the image reading device 1 reads the first line image or the second line image in the image buffer (step S75). After removing the correction complete flag (step S76), the image reading device 1 creates the composite band image (step S77), and completes the synthesizing process. In response to determining not to perform the correcting process in step S72 (when a result of step S72 is NO), the image reading device 1 skips the correcting process. The image reading device 1 reads the first line image or the second line image in the image buffer (step S75) and creates the composite band image (step S77). It may be determined that the correction complete flag is not assigned after the correcting process (when a result of step S74 is NO). More specifically, the timings to read the first line image and the second line image are not synchronized. In such a case, the image reading device 1 skips the process in steps S75 to S77 and completes the synthesizing process.

Figure 13:
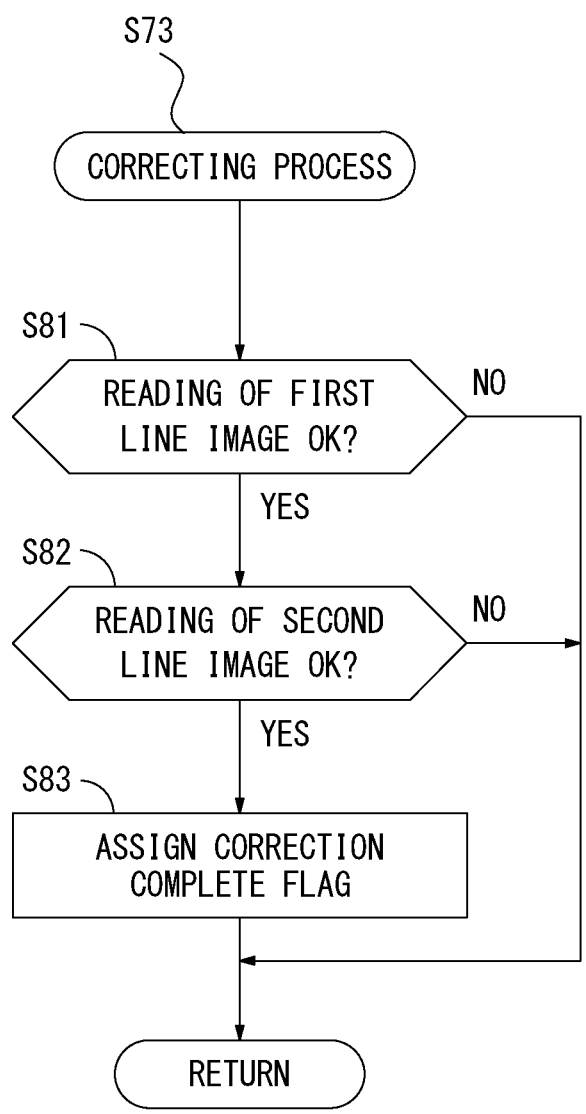
FIG. 13 is a flow diagram explaining a detailed exemplary sequential procedure of a correcting process.

FIG. 13 is a flow diagram explaining a detailed exemplary sequential procedure of the correcting process (step S73 in FIG. 12). The image reading device 1 determines if the reading of the first line image is possible (step S81). When determining that the reading is possible (when a result of step S81 is YES), the image reading device 1 determines if the reading of the second line image is possible (step S82). When determining that the reading of the second line image is possible (when a result of step S82 is YES), the image reading device 1 assigns the correction complete flag (step S83) and completes the process as the timings to read the first line image and the second line image are successfully synchronized. The image reading device 1 may determine that either of the first line image or the second line image is not allowed to be read in step S81 or S82 (when a result of step S81 or S82 is NO), in which case the image reading device 1 completes the correcting process without assigning the correction complete flag. The reading positions of the first side and the second side at the image reading device 1 are different. Hence, the timing to create the first line image differs from the timing to create the second line image. By synchronizing the reading timings through the correcting process, the difference based on the reading timings is allowed to be corrected.

Figure 14:
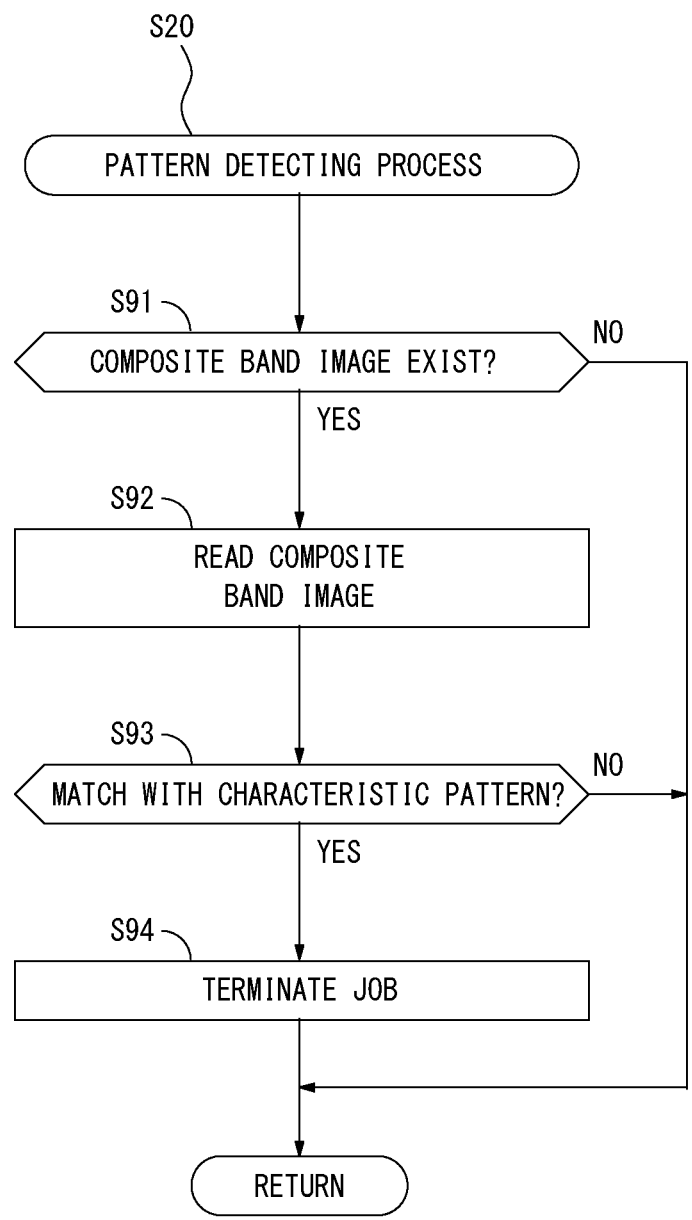
FIG. 14 is a flow diagram explaining a detailed exemplary sequential procedure of a pattern detecting process.
Figure 16A:
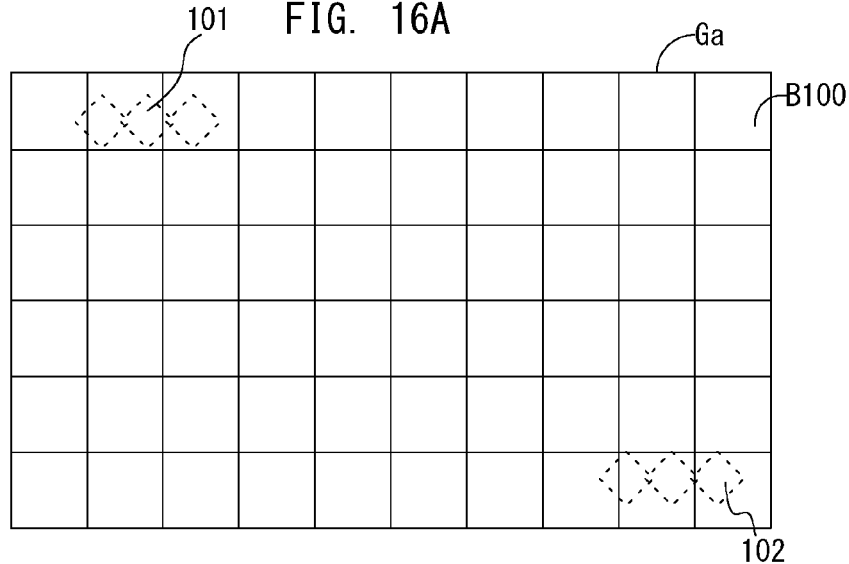
FIGS. 16A, 16B and 16C show an example of a detecting process of the specific document according to a known technique.
Figure 16B:
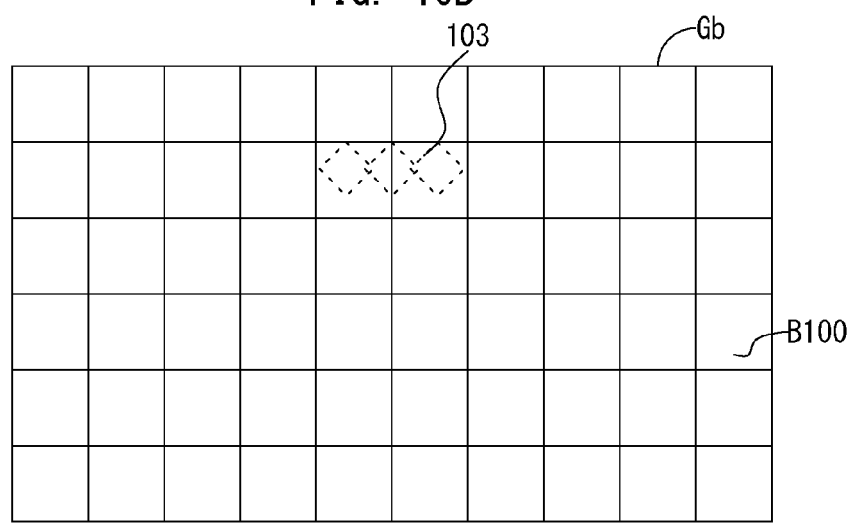
Figure 16C:
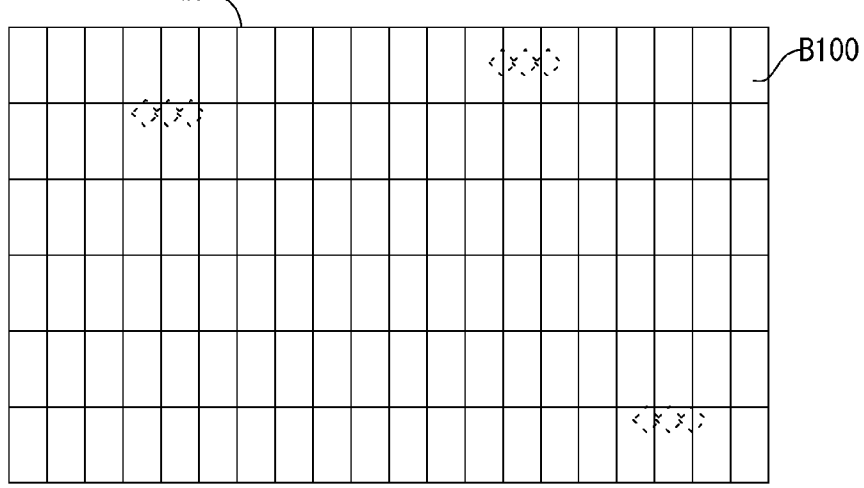

FIG. 14 is a flow diagram explaining a detailed exemplary sequential procedure of the pattern detecting process (step S20 in FIG. 10). The image reading device 1 determines if there is the composite band image (step S91). When determining that the composite band image is not created by the image synthesizing part 45 (when a result of step S91 is NO), the image reading device 1 completes the pattern detecting process. When determining that the composite band image is created (when a result of step S91 is YES), the image reading device 1 reads the composite band image (step S92). The image reading device 1 reads the composite band image and determines whether or not the image contained in the composite band image matches with the characteristic pattern (step S93). In response to determining that the image contained in the composite band image matches with the characteristic pattern (when a result of step S93 is YES), the image reading device 1 terminates the job (step S94) and controls not to continue the image reading operation of the specific document. On the other hand, when determining that the image contained in the composite band image does not match with the characteristic pattern (when a result of step S93 is NO), the image reading device 1 skips the process in step S94.

FIG. 15 is a flow diagram explaining a detailed exemplary sequential procedure of the document side determining process (step S25 in FIG. 10). The image reading device 1 determines if any characteristic pattern is detected from the composite image in the predetermined manner (step S101). This includes when the multiple phases of characteristic patterns are detected, or when two specific documents are laid on top of one another and read at the image reading device 1 as a single document including when the characteristic patterns are laid on top of one another, for example. When determining that the characteristic pattern is detected in the predetermined manner (when a result of step S101 is YES), the image reading device 1 determines that the characteristic pattern is detected from the first side and the second side (step S102), then completes the process.

When determining that no characteristic pattern is detected in the predetermined manner (when a result of step S101 is NO), the image reading device 1 reads the first stated image (step S103). The image reading device 1 reads the first stated image and determines whether or not the image contained in the first stated image matches with the characteristic pattern (step S105). In response to determining that the image contained in the first stated image matches with the characteristic pattern, the image reading device 1 determines that the characteristic pattern is detected from the first side (step S107), then completes the process. On the other hand, when determining that the image contained in the first stated image does not match with the characteristic pattern (when a result of step S105 is NO), the image reading device 1 reads the second stated image (step S108) and determines whether or not the image contained in the second stated image matches with the characteristic pattern (step S110). In response to determining that the image contained in the second stated image matches with the characteristic pattern (when a result of step S110 is YES), the image reading device 1 determines that the characteristic pattern is detected from the second side (step S112), then completes the process. When determining that the image contained in the second stated image does not match with the characteristic pattern (when a result of step S110 is NO), the image reading device 1 determines it is the detecting error because of the false detection in the pattern detecting process (step S114).

The image reading device 1 of the present preferred embodiment reads the first stated image in step S103 and the second stated image in step S108. The image reading device 1 may read the first image in the memory and determine if the image in the first image matches with the characteristic pattern in step S103. Alternatively, the image reading device 1 may read the second image in the memory and determine if the image in the second image matches with the characteristic pattern in step S108. Still alternatively, when determining that the image in the first stated image does not match with the characteristic pattern, the image reading device 1 may determine the characteristic pattern is detected from the second side in step S105. Still alternatively, the image reading device 1 may restart the job which is terminated in the pattern detecting process when determining that it is the detecting error because of the false detection in step S114.

As described above, the image reading device 1 of the present application is capable of determining if the two images of the first side and the second side of the read document are the specific documents in a single process. In addition, the image reading device 1 takes to determine the first side and the second side almost the same time as that required for determining only a single image.

(Modifications)

While the preferred embodiment of the present invention has been described above, the present invention is not limited to the preferred embodiment. Various modifications may be applied to the present invention.

According to the above-described preferred embodiment, the job is executed when the reading operation of the entire documents is complete and no characteristic pattern is detected. However, this is given not for limitation. Even before completion of the reading operation of the document, the job may be executed about the document from which the characteristic pattern is not detected through the pattern detecting process (step S20 in FIG. 10). As a result, the delay of the execution of the job is not caused and prompt execution of the job may be realized.

According to the above-described preferred embodiment, it is explained as an example that the matching of the image contained in the composite band image forming the composite image with the characteristic pattern is determined in the detecting process of the characteristic pattern. However, this is given not for limitation. The matching of the image contained in the composite image with the characteristic pattern may be determined after the composite image is created.

What is claimed is:

1. An image reading device comprising:
a feeder that feeds a document along a predetermined path;
a first imaging device that reads a first side of said document at a first position in said path and creates a first image;
a second imaging device that reads a second side of said document at a second position which is located posterior to said first position in said path and creates a second image;
a processor that executes a program stored in a memory to perform operations including:
laying one of said first image and said second image on top of the other one of said first image and said second image and creating a composite image;
detecting a characteristic pattern of a specific document from said composite image; and
prohibiting output of said first image or said second image when said characteristic pattern is detected from said composite image,
wherein:
said first imaging device extracts a frequency component of said characteristic pattern from image data of said first side of said document to create a first stated image as said first image, and
said second imaging device extracts the frequency component of said characteristic pattern from image data of said second side of said document to create a second stated image as said second image.

2. The image reading device according to claim 1, further comprising:
a storage in which said first image and said second image are stored,
wherein said processor reads said first image and said second image from said storage.

3. The image reading device according to claim 2, wherein:
said first imaging device reads said first side along a predetermined reading line to create first line images that form said first image, and stores said created first line images in said storage,
said second imaging device reads said second side along the predetermined reading line to create second line images that form said second image, and stores said created second line images in said storage,
said processor reads predetermined lines of said first line images or said second line images and creates a composite band image that forms said composite image, and said processor detects said characteristic pattern from said composite band image.

4. The image reading device according to claim 3, wherein said processor executes the program stored in the memory to perform further operations including:
correcting a difference between a timing to begin creation of said first image and a timing to begin creation of said second image, wherein said correcting comprises synchronizing timings to read a first one of said first line images and a first one of said second line images, and
reading from said storage and synthesizing the first one of said first line images and the first one of said second line images, thereby creating a first said composite band image.

5. The image reading device according to claim 3, wherein said processor creates said composite band image after the predetermined lines of said first line images or said second line images are stored in said storage.

6. An image reading device comprising:
a feeder that feeds a document along a predetermined path;
a first imaging device that reads a first side of said document at a first position in said path and creates a first image;

a second imaging device that reads a second side of said document at a second position which is located posterior to said first position in said path and creates a second image;

a storage in which said first image and said second image are stored; and a processor that executes a program stored in a memory to perform operations including:

reading said first image and said second image from said storage;

laying one of said first image and said second image on top of the other one of said first image and said second image and creating a composite image;

detecting a characteristic pattern of a specific document from said composite image; and prohibiting output of said first image or said second image when said characteristic pattern is detected from said composite image; and wherein:

said first imaging device reads said first side along a predetermined reading line to create first line images that form said first image, and stores said created first line images in said storage, said second imaging device reads said second side along the predetermined reading line to create second line images that form said second image, and stores said created second line images in said storage, said processor reads predetermined lines of said first line images or said second line images and creates a composite band image that forms said composite image, said processor detects said characteristic pattern from said composite band image, said processor creates said composite band image after the predetermined lines of said first line images or said second line images are stored in said storage, and said processor executes the program stored in the memory to perform further operations including:

waiting until both of said first line images and said second line images are allowed to be read and reading said first line images and said second line images in said storage when one of said first line images and said second line images is allowed to be read but the other is not, and synthesizing said read first line images and said read second line images read, thereby creating said composite band image.

7. The image reading device according to claim 6, wherein:

said first imaging device extracts an image component that has an image characteristic of said characteristic pattern from image data of said first side of said document to create a first stated image as said first image; and said second imaging device extracts an image component that has the image characteristic of said characteristic pattern from image data of said second side of said document to create a second stated image as said second image.

8. The image reading device according to claim 7, wherein:

said first imaging device extracts a color component of said characteristic pattern from said first image to create said first stated image, and said second imaging device extracts the color component of said characteristic pattern from said second image to create said second stated image.

9. The image reading device according to claim 7, wherein:

said first imaging device extracts a frequency component of said characteristic pattern from said first image to create said first stated image, and said second imaging device extracts the frequency component of said characteristic pattern from said second image to create said second stated image.

10. The image reading device according to claim 6, wherein said processor executes the program stored in the memory to perform further operations including:

terminating creation of said first image or said second image by said first imaging device or said second imaging device when said characteristic pattern is detected from said composite band image.

11. The image reading device according to claim 6, wherein said processor executes the program stored in the memory to perform further operations including:

detecting said characteristic pattern from each of said first image and said second image when said characteristic pattern is detected from said composite image; and determining from which side of the document said characteristic pattern is detected based on the detecting result.

12. The image reading device according to claim 11, wherein said processor determines that said characteristic pattern is detected from said first side and said second side when said characteristic pattern detected from said composite image is in a predetermined manner.

13. A non-transitory computer readable recording medium storing a program to be executed by an image reading device that includes a processor, a feeder that feeds a document along a predetermined path; a first imaging device that reads a first side of said document at a first position in said path and creates a first image; a second imaging device that reads a second side of said document at a second position which is located posterior to said first position in said path and creates a second image; and a storage in which said first image and said second image are stored, said program, when executed by said processor of said image reading device, causing the processor to perform operations comprising:

reading said first image and said second image from said storage in which said first image and said second image are stored;

laying one of said first image and said second image on top of the other one of said first image and said second image and creating a composite image;

detecting a characteristic pattern of a specific document from said composite image; and prohibiting output of said first image or said second image when said characteristic pattern is detected from said composite image, wherein said first imaging device reads said first side along a predetermined reading line to create first line images that form said first image, and stores said created first line images in said storage, and said second imaging device reads said second side along the predetermined reading line to create second line images that form said second image, and stores said created second line images in said storage, wherein said program further causes the processor to perform operations comprising:

reading predetermined lines of said first line images or said second line images and creating a composite band image that forms said composite image; and detecting said characteristic pattern from said composite band image;

wherein said processor creates said composite band image after the predetermined lines of said first line images or said second line images are stored in said storage, and wherein said program further causes the processor to perform operations comprising:

waiting until both of said first line images and said second line images are allowed to be read and reading said first line images and said second line images in said storage when one of said first line images and said second line images is allowed to be read but the other is not, and synthesizing said read first line images and said read second line images, thereby creating said composite band image.

14. The non-transitory computer readable recording medium according to claim 13, wherein said program further causes the processor to perform operations comprising:

terminating creation of said first image or said second image by said first imaging device or said second imaging device when said characteristic pattern is detected from said composite band image.

15. The non-transitory computer readable recording medium according to claim 13, wherein said program further causes the processor to perform operations comprising:

detecting said characteristic pattern from each of said first image and said second image when said characteristic pattern is detected from said composite image; and determining from which side of the document said characteristic pattern is detected based on the detecting result.

16. The non-transitory computer readable recording medium according to claim 15, wherein said determining determines that said characteristic pattern is detected from said first side and said second side when said characteristic pattern detected from said composite image is in a predetermined manner.

* * * * *